United States Patent
Gao et al.

(10) Patent No.: US 11,310,128 B2
(45) Date of Patent: Apr. 19, 2022

(54) SOFTWARE-DEFINABLE NETWORK SERVICE CONFIGURATION METHOD

(71) Applicant: ZHEJIANG GONGSHANG UNIVERSITY, Zhejiang (CN)

(72) Inventors: Ming Gao, Zhejiang (CN); Weiming Wang, Zhejiang (CN)

(73) Assignee: Zhejiang Gongshang University, Zhejiang (CN)

( * ) Notice: Subject to any disclaimer, the term of this patent is extended or adjusted under 35 U.S.C. 154(b) by 208 days.

(21) Appl. No.: 16/070,293

(22) PCT Filed: May 30, 2017

(86) PCT No.: PCT/CN2017/086510
§ 371 (c)(1),
(2) Date: Jul. 23, 2020

(87) PCT Pub. No.: WO2018/218472
PCT Pub. Date: Dec. 6, 2018

(65) Prior Publication Data
US 2021/0320852 A1    Oct. 14, 2021

(51) Int. Cl.
| | |
|---|---|
| H04L 12/24 | (2006.01) |
| H04L 12/707 | (2013.01) |
| H04L 41/5054 | (2022.01) |
| H04L 41/0816 | (2022.01) |
| H04L 41/5041 | (2022.01) |
| H04L 45/24 | (2022.01) |

(52) U.S. Cl.
CPC ...... *H04L 41/5054* (2013.01); *H04L 41/0816* (2013.01); *H04L 41/5045* (2013.01); *H04L 45/24* (2013.01)

(58) Field of Classification Search
CPC ............. H04L 41/5054; H04L 41/0816; H04L 41/5045; H04L 45/24
See application file for complete search history.

(56) References Cited

U.S. PATENT DOCUMENTS

| | | | |
|---|---|---|---|
| 20,142,448 | | 8/2014 | Pouyilau |
| 2013/0286942 A1* | | 10/2013 | Bonar ............... H04L 45/24 370/328 |

FOREIGN PATENT DOCUMENTS

| | | |
|---|---|---|
| CN | 101883049 | 11/2010 |
| CN | 102104542 | 6/2011 |
| CN | 104320278 | 1/2015 |
| EP | 2568672 | 3/2013 |
| WO | 2013026618 | 2/2013 |

* cited by examiner

*Primary Examiner* — Joe Chacko

(57) ABSTRACT

Service deployment in the conventional network is very complicated. Operator needs to plan the service path in advance, and then manually configure the policy for each node on the service path. The software-definable network service configuration method disclosed in the present invention is different from the conventional network. On the one hand, the control layer has a global network resource view to more easily plan service paths for service requests. On the other hand, the control layer adopts a centralized management of physical switch nodes in the data layer via a southbound interface, which makes it easier to automatically implement policy configuration in physical switch nodes.

8 Claims, 1 Drawing Sheet

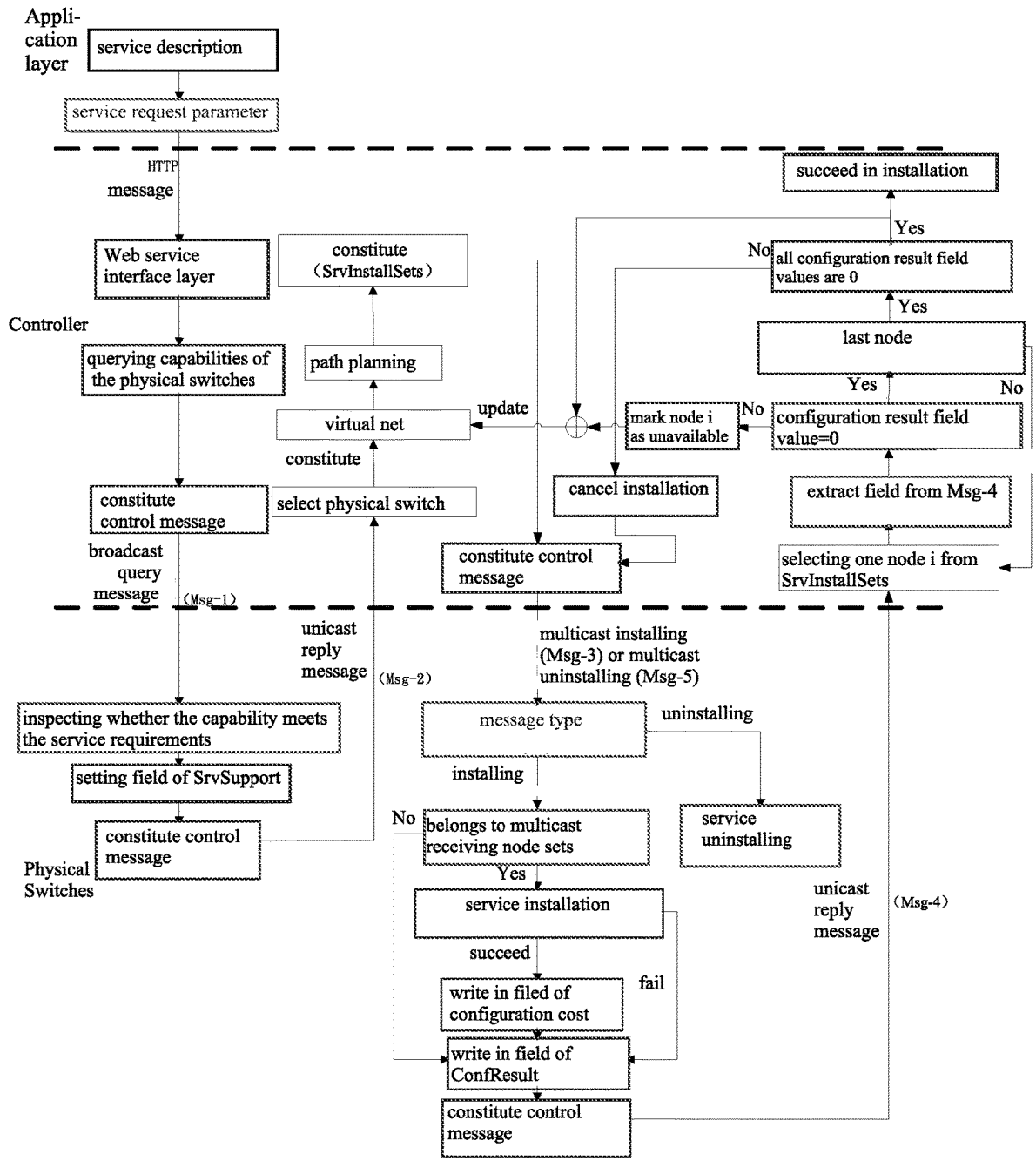

SOFTWARE-DEFINABLE NETWORK SERVICE CONFIGURATION METHOD

CROSS REFERENCE OF RELATED APPLICATION

This is a U.S. National Stage under 35 U.S.C 371 of the International Application PCT/CN2017/086510, filed May 30, 2017.

BACKGROUND OF THE PRESENT INVENTION

Field of Invention

The present invention relates to the technical field of network communications, and more particularly to a software-definable network service configuration method.

Description of Related Arts

Computer networks usually consist of a plurality of routers, and network middleware with various functions. In order to effectively manage the network, administrators formulate various policies based on the services carried by the current network, such as video, language, Web, and etc. Due to the lack of available tools, administrators need to manually convert these advanced policies into low-level configuration commands capable of being recognized by network devices. The task is challenging and extremely error-prone.

Another difficulty that can hardly be overcome by network practitioners and researchers is the "rigidity" of the Internet. The huge deployment scale of the Internet has made it a key infrastructure in the society. With the continuous expansion of deployment scale, the evolution and change of the Internet itself has become more and more difficult. The internet, which was designed to solve the basic interconnection problems decades ago, is becoming more and more powerless in the face of the various and ever-changing problems.

In the above background, the programmable network represented by IETF ForCES (Forwarding and Control Seperation, ForCES) is proposed as a means to promote network evolution. Software Defined Network (SDN) is a new form of programmable network that provides a new type of network architecture. By separating the forwarding and control planes in the network, SDN aims to simplify network management, support network innovation and evolution, and is expected to fundamentally solve the "rigid" problem of the Internet.

As mentioned above, the current Internet is "rigid", and the root cause of this "rigid" phenomenon is the excessive coupling between the network control plane and the data plane. Each network device makes independent decisions on the data flowing through. In this kind of network environment, deploying a new service is undoubtedly not an easy task because the administrator needs to configure each device in the basic network. Of course, as an alternative solution to the "rigid" problem of the Internet, a large number of various network function boxes, such as firewalls, intrusion detection systems, and address converters, etc., can be placed on the basic interconnection part at the bottom of the network. For managers, the cost of management is too high and it is a last resort choice.

The fundamental goal of the separation of forwarding and control is to enable easy programming of the network data path. By separating the control and physical forwarding of the network equipment, centralized control within the entire network is realized. The so-called centralized control does not mean that there is only one physical controller in the network, but a logical centralized control. Obviously, this control method is good for deploying new network protocols and services. The global network view is conducive to network management and integration of various network function systems.

SUMMARY OF THE PRESENT INVENTION

In order to solve the technical problems, the present invention adopts a technical solution which comprises following steps of:

step (1) providing an application layer, a control layer and a data layer to constitute a network, wherein an entity of the control layer is a controller, and an entity of the data layer is a physical switch;

step (2) describing a required service through the application layer by a user, forming a service request and transferring the service request via a web service interface to the controller;

step (3) sending a first control message Msg-1 to all physical switches in the data layer in a broadcast mode by the controller to inquire capabilities of each of the physical switches;

wherein the first control message comprises 8 fields of: a message type (MsgType), a service ID (SrvID), a service description (SrvDesc), receiving node set (RecvSets), transmitting node sets (TransSets), a service support (SrvSupport), a service configuration result (ConfResult) and a service configuration cost (ConfCost); wherein a MsgType value of 0 represents query, a MsgType value of 1 represents reply, a MsgType value of 2 represents service installation and a MsgType value of 3 represents service;

wherein when querying capabilities of each of the physical switches, the MsgType in Msg-1 is set to 0, an initial value of the RecvSets is set to null; initial values of SrvSupport, ConfResult and ConfCost are all set to −1;

step (4) after receiving Msg-1, firstly checking whether the physical switches support services corresponding to SrvID by the physical switches; if the physical switches fail to support services corresponding to SrvID, a value of the SrvSupport is set to 1; if the physical switches are capable of supporting the services corresponding to SrvID, a value of the SrvSupport is set to 0;

step (5) the value of the SrvSupport set in the step (4) is written into a second control message (Msg-2) by the physical switches; wherein the value of MsgType is set to 1, other field values are identical to Msg-1; the Msg-2 is sent back to the controller in a unicast mode;

step (6) after receiving the Msg-2 by the controller, selecting the physical switches being capable of supporting the service corresponding to the SrvID; and constituting a virtual net vNet based on the service corresponding to the SrvID;

step (7) executing a user-defined path planning algorithm in the virtual net vNet to obtain optimal service deployment path (Path), so as to constitute service install nodes set (SrvInstallSets); wherein each element in the SrvInstallSets corresponds to a physical switch in the Path;

step (8) transmitting a third control massage (Msg-3) to each of the physical switches on the Path in a multicast mode by the controller; and starting an installing process of a service corresponding to the SrvID;

wherein a MsgType of the third control message (Msg-3) is set 2, a field of the RecvSets is set to SrvInstallSets; a field of the SrvSupport is set to 1, a field of the ConfResult is set to −1 and a field of the ConfCost is set to −1;

step (9) after receiving the third control message Msg-3, each of the physical switches executing following steps of:

step (9-1) determining whether the physical switches belong to the field of RecvSets in the Msg-3, if no, a value of the field of the ConfResult is set to 2, enter step (9-3); if yes, directly enter a step (9-2);

step (9-2) executing a service installing process by the physical switches, wherein if the installing process succeeds, the value of the field of the ConfCost is set to be an overhead of the current resource; while the value of the field of ConfResult is set to 0; if the installing process is failed, the value of the field of ConfResult is set to 1;

step (9-3) writing values of fields which are revised into a fourth control message (Msg-4) by the physical switches, wherein MsgType is set to 1, other fields are identical to the third control message Msg-3; transmitting the fourth control message Msg-4 back to the controller in a unicast mode;

step (10) traversing the control message Msg-4 transmitted back by each of the physical switches in the nodes set SrvInstallSets by the controller; wherein if the value of the field of the ConfResult of the fourth control message Msg-4 is 0, service configuration is successful; updating messages in the virtual net vNet according to the field of ConfCost; wherein if not all values of fields of the ConfResult of all of the control messages are 0, the service configuration is not successful; executing following steps;

step (10-1) constituting a fifth control message Msg-5 by the controller; setting the MsgType to 3; wherein other fields of the Msg-5 are identical to the fields of the Msg-3; wherein the fifth control messages Msg-5 are transmitted to each of the physical switches on the Path in a multicast mode;

step (10-2) uninstalling service corresponding to SrvID after receiving the Msg-5 by the physical switches;

finding out a physical switch corresponded to the fourth control message Msg-4 with a ConfResult field value of 1 by the controller and identifying the physical switch as unavailable in the vNet; entering the step (7).

Beneficial effects of the present invention are as follows. Service deployment in the conventional network is very complicated. Operator needs to plan the service path in advance, and then manually configure the policy for each node on the service path. The software-definable network service configuration method disclosed in the present invention is different from the conventional network. On the one hand, the control layer has a global network resource view to more easily plan service paths for service requests. On the other hand, the control layer adopts a centralized management of physical switch nodes in the data layer via a southbound interface, which makes it easier to automatically implement policy configuration in physical switch nodes.

BRIEF DESCRIPTION OF THE DRAWINGS

The FIGURE is a flow chart showing business deployment process of the present invention.

DETAILED DESCRIPTION OF THE PREFERRED EMBODIMENT

The present invention is further illustrated combining with the accompany drawing and the preferred embodiments.

As shown in the FIGURE, the present invention provides a software-definable network service configuration method, comprising following steps of:

step (1) providing an application layer, a control layer and a data layer to constitute a network, wherein an entity of the control layer is a controller, and an entity of the data layer is a physical switch;

step (2) describing a required service through the application layer by a user, forming a service request and transferring the service request via a web service interface to the controller;

step (3) sending a first control message Msg-1 to all physical switches in the data layer in a broadcast mode by the controller to inquire capabilities of each of the physical switches.

The first control message comprises 8 fields of: a message type (MsgType), a service ID (SrvID), a service description (SrvDesc), receiving node set (RecvSets), transmitting node sets (TransSets), a service support (SrvSupport), a service configuration result (ConfResult) and a service configuration cost (ConfCost); wherein a MsgType value of 0 represents query, a MsgType value of 1 represents reply, a MsgType value of 2 represents service installation and a MsgType value of 3 represents service;

wherein when querying capabilities of each of the physical switches, the MsgType in Msg-1 is set to 0, an initial value of the RecvSets is set to null; initial values of SrvSupport, ConfResult and ConfCost are all set to −1;

step (4) after receiving Msg-1, firstly checking whether the physical switches support services corresponding to SrvID by the physical switches; if the physical switches fail to support services corresponding to SrvID, a value of the SrvSupport is set to 1; if the physical switches are capable of supporting the services corresponding to SrvID, a value of the SrvSupport is set to 0;

step (5) the value of the SrvSupport set in the step (4) is written into a second control message (Msg-2) by the physical switches; wherein the value of MsgType is set to 1, other field values are identical to Msg-1; the Msg-2 is sent back to the controller in a unicast mode;

step (6) after receiving the Msg-2 by the controller, selecting the physical switches being capable of supporting the service corresponding to the SrvID; and constituting a virtual net vNet based on the service corresponding to the SrvID;

step (7) executing a user-defined path planning algorithm in the virtual net vNet to obtain optimal service deployment path (Path), so as to constitute service install nodes set (SrvInstallSets); wherein each element in the SrvInstallSets corresponds to a physical switch in the Path;

step (8) transmitting a third control massage (Msg-3) to each of the physical switches on the Path in a multicast mode by the controller; and starting an installing process of a service corresponding to the SrvID;

wherein a MsgType of the third control message (Msg-3) is set 2, a field of the RecvSets is set to SrvInstallSets; a field of the SrvSupport is set to 1, a field of the ConfResult is set to −1 and a field of the ConfCost is set to −1;

step (9) after receiving the third control message Msg-3, each of the physical switches executing following steps of:

step (9-1) determining whether the physical switches belong to the field of RecvSets in the Msg-3, if no, a value of the field of the ConfResult is set to 2, enter a step 9-3; if yes, directly enter a step (9-2);

step (9-2) executing a service installing process by the physical switches, wherein if the installing process succeeds, the value of the field of the ConfCost is set to be an overhead of the current resource; while the value of the field of ConfResult is set to 0; if the installing process is failed, the value of the field of ConfResult is set to 1;

step (9-3) writing values of fields which are revised into a fourth control message (Msg-4) by the physical switches, wherein MsgType is set to 1, other fields are identical to the third control message Msg-3; transmitting the fourth control message Msg-4 back to the controller in a unicast mode;

step (10) traversing the control message Msg-4 transmitted back by each of the physical switches in the nodes set SrvInstallSets by the controller; wherein if the value of the field of the ConfResult of the fourth control message Msg-4 is 0, service configuration is successful; updating messages in the virtual net vNet according to the field of ConfCost; wherein if not all values of fields of the ConfResult of all of the control messages are 0, the service configuration is not successful; executing following steps;

step (10-1) constituting a fifth control messages Msg-5 by the controller; setting the MsgType to 3; wherein other fields of the Msg-5 are identical to the fields of the Msg-3; wherein the fifth control messages Msg-5 are transmitted to each of the physical switches on the Path in a multicast mode;

step (10-2) uninstalling service corresponding to SrvID after receiving Msg-5 by the physical switches;

finding out a physical switch corresponded to the fourth control message Msg-4 with a ConfResult field value of 1 by the controller and identifying the physical switch as unavailable in the vNet; entering the step (7).

Embodiment

In order to facilitate those skilled in the art to understand and implement the present invention, the technical solutions of the present invention will be further described with reference to the accompanying drawings, and a specific embodiment of the present invention will be given.

The topology and node capabilities in the network dynamically change to obtain real-time, accurate global network resource view. When a new service request arrives, the controller actively and downwardly queries the capabilities and links of the physical nodes in an infrastructure layer. The physical nodes which are queried feedback their own capability information and connection status to the controller. The controller plans the service path according to feedback information of the infrastructure layer, generates a configuration command required for each physical node, and then issues a configuration command for each physical node. Finally, the physical node executes the configuration command and feeds back the operating status to the controller. During the process, a virtual network is constructed and maintained by the controller for each type of network service. The virtual network contains the service path required by the service request.

Based on the analysis mentioned above, referring to FIG. 1, the service configuration method of the present invention can be implemented as follows.

Firstly, the user can describe the service to be deployed through a graphical human-computer interaction interface. Description result is quantified into specific service request parameters and HTTP message is constructed accordingly. Web service interface of the control layer is accessed, which can be a RESTful API like Web Service.

The controller initiates the capability query process of the physical switch in the data layer. In the process, a control message needs to be constructed to query capabilities of each physical switch. Since the support capability of each physical switch of the new service is not yet known, a broadcast method is adopted to send the control message to each physical switch. The control message comprises 8 fields of: a message type (MsgType), a service ID (SrvID), a service description (SrvDesc), receiving node set (RecvSets), transmitting node sets (TransSets), a service support (SrvSupport), a service configuration result (ConfResult) and a service configuration cost (ConfCost); wherein when a value of the MsgType is 0, wherein a MsgType value of 0 represents query, a MsgType value of 1 represents reply, a MsgType value of 2 represents service installation and a MsgType value of 3 represents service; wherein the 8 fields are sufficient enough to describe a service and an installation process thereof. At the moment, At this time, an initial value of RecvSets in a query message is set to null, and initial values of fields of the SrvSupport, ConfResult, and ConfCost are set to −1. The value of MsgType is 0 for query, 1 for reply, 2 for service installation, and 3 for service offload.

Each physical switch receives a query message from the controller, first determine whether the physical switch supports the service requested in the query message. If not, set SrvSupport to 1, indicating that the physical switch does not support the service; if yes, then determine whether the service specification described by SrvDesc can be met; if yes, the field of the SrvSupport is set to 0; if no, the field of SrvSupport is set to 2, indicating that the physical switch may support the service but the capacity is insufficient. Each physical switch reconstructs a reply message according to a result of its own inspection and informs the control unit in a unicast manner.

According to the queried physical node capabilities and link information, the controller updates the network resource view, selects a physical switch that can support the requested service, builds and maintains a virtual network, and executes a customized service path discovery algorithm in the virtual network, which may be a shortest path first algorithm and may also be a distance vector algorithm, and etc., so as to obtain an optimal service deployment path. After that, for each node on a proposed service deployment path, a business installation node set of SrvInstallSets is constructed, and each element in the business installation node set is corresponded to a physical switch on the path.

The controller and each of the physical switches on service path form a one-to-many correspondence. At this moment, messages sent by the controller to each of the physical switches are suitable for the multicast mode; wherein a multicast source is the controller, and a group member is each of the physical switches on the service path. The controller multicasts control messages to all physical switches in the data layer to instruct the physical switch to perform service installation. At this moment, the field of RecvSets in the control message is set to a service installation node set, the field of SrvSupport is set to 1, the field of ConfResult is set to −1, and the field of ConfCost is set to −1, because it is already possible to determine that the physical switch that receives the control message inevitably supports this service, but service configuration results and service configuration costs are still unknown.

Next, each of the physical switches that receives the multicast service installation message firstly checks whether each of the physical switches belongs to the recipient of the installation message by judging the field of RecvSets in the message. Generally, there is no problem with this step, otherwise the physical switch is not capable of receiving multicast messages, but accidents are not excluded. Therefore, if the physical switch does not recognize itself as a recipient of the installation message, it needs to notify the control device in a unicast manner. If the physical switch belongs to the recipient of the installation message, the service installation process is performed. The installation process specifically indicates that the computing resources and the link resources are allocated according to the service operation. After the installation succeeds, the resource overhead is written into the field of ConfCost in the control message; at the moment, the field of ConfResult in the control message is set to 0. If the installation is not successful, the field of ConfResult field is set to 1 to indicate that the installation fails. After that, a control message is constructed based on the result of the installation, and the control message is notified by the controller in a unicast manner.

Each node of the physical switches in the service installation node set SrvInstallSets is checked and feeds back installation confirmation messages by the controller. If all the ConfResults in the installation confirmation messages are 0, the service deployment path Path is completely successful; otherwise, the service deployment path Path is unsuccessful. At the moment, the controller also needs to withdraw an original installation process here, and the control component constructs control messages for performing the service unloading process and multicasting it to each of the physical switches on the Path to perform the service unloading process.

If the path to the service deployment path is unsuccessful, the controller identifies the physical switch whose installation service is unsuccessful as being unavailable in the virtual network, and then re-plans the service deployment path and performs the installation process.

What needs to be added is that in the above service deployment process, an important task of the controller is to construct a virtual network based on the network resource view. The network resource view is a subset of an underlying physical network in the data layer. It records the topology and resource distribution in the physical network in real time; wherein the resource distribution includes link bandwidth occupation and node capability usage conditions.

What is claimed is:

1. A method for configuring software-definable network service, comprising steps of:
    step (1) providing an application layer, a control layer and a data layer to constitute a network, wherein an entity of the control layer is a controller, and an entity of the data layer is a physical switch;
    step (2) describing a required service through the application layer by a user, forming a service request and transferring the service request via a web service interface to the controller;
    step (3) sending a first control message Msg-1 to all physical switches in the data layer in a broadcast mode by the controller to inquire capabilities of each of the physical switches;
    wherein the first control message comprises 8 fields of: a message type (MsgType), a service ID (SrvID), a service description (SrvDesc), receiving node set (RecvSets), transmitting node sets (TransSets), a service support (SrvSupport), a service configuration result (ConfResult) and a service configuration cost (ConfCost); wherein a MsgType value of 0 represents query, a MsgType value of 1 represents reply, a MsgType value of 2 represents service installation and a MsgType value of 3 represents service;
    wherein when querying capabilities of each of the physical switches, the MsgType in Msg-1 is set to 0, an initial value of the RecvSets is set to null; initial values of SrvSupport, ConfResult and ConfCost are all set to −1;
    step (4) after receiving Msg-1, firstly checking whether the physical switches support services corresponding to SrvID by the physical switches; if the physical switches fail to support services corresponding to SrvID, a value of the SrvSupport is set to 1; if the physical switches are capable of supporting the services corresponding to SrvID, a field value of the SrvSupport is set to 0;
    step (5) the value of the SrvSupport set in the step (4) is written into a second control message (Msg-2) by the physical switches; wherein the value of MsgType is set to 1, other field values are identical to Msg-1; the Msg-2 is sent back to the controller in a unicast mode;
    step (6) after receiving the Msg-2 by the controller, selecting the physical switches being capable of supporting the service corresponding to the SrvID; and constituting a virtual net vNet based on the service corresponding to the SrvID;
    step (7) executing a user-defined path planning algorithm in the virtual net vNet to obtain optimal service deployment path (Path), so as to constitute service install nodes set (SrvInstallSets); wherein each element in the SrvInstallSets corresponds to a physical switch in the Path;
    step (8) sending a third control massage (Msg-3) to each of the physical switches on the Path in a multicast mode by the controller; and starting an installing process of a service corresponding to the SrvID;
    wherein a MsgType of the third control message (Msg-3) is set 2, a field of the RecvSets is set to SrvInstallSets; a field of the SrvSupport is set to 1, a field of the ConfResult is set to −1 and a field of the ConfCost is set to −1;
    step (9) after receiving the third control message Msg-3, each of the physical switches executing following steps of:
    step (9-1) determining whether the physical switches belong to the field of RecvSets in the Msg-3, if no, a value of the field of the ConfResult is set to 2, enter step (9-3); if yes, directly enter a step (9-2);
    step (9-2) executing a service installing process by the physical switches, wherein if the installing process succeeds, the value of the field of the ConfCost is set to be an overhead of the current resource; while the value of the field of ConfResult is set to 0; if the installing process is failed, the value of the field of ConfResult is set to 1;
    step (9-3) writing values of fields which are revised into a fourth control message (Msg-4) by the physical switches, wherein MsgType is set to 1, other fields are identical to the third control message Msg-3; transmitting the fourth control message Msg-4 back to the controller in a unicast mode;
    step (10) traversing the control message Msg-4 transmitted back by each of the physical switches in the nodes set SrvInstallSets by the controller; wherein if the value of the field of the ConfResult of the fourth control message Msg-4 is 0, service configuration is successful; updating messages in the virtual net vNet according to the field of ConfCost; wherein if not all values of fields of the ConfResult of all of the control messages are 0, the service configuration is not successful; executing following steps;
    step (10-1) constituting a fifth control message Msg-5 by the controller; setting the MsgType to 3; wherein other fields of the Msg-5 are identical to the fields of the Msg-3; wherein the fifth control messages Msg-5 are transmitted to each of the physical switches on the Path in a multicast mode;

step (10-2) uninstalling service corresponding to SrvID after receiving the Msg-5 by the physical switches;

finding out a physical switch corresponded to the fourth control message Msg-4 with a ConfResult field value of 1 by the controller and identifying the physical switch as unavailable in the vNet; entering the step (7).

2. A method for configuring software-definable network service, comprising steps of:

step (1) providing an application layer, a control layer and a data layer to constitute a network, wherein an entity of the control layer is a controller, and an entity of the data layer is a physical switch;

step (2) describing a required service through the application layer by a user, forming a service request and transferring the service request via a web service interface to the controller;

step (3) sending a first control message Msg-1 to all physical switches in the data layer in a broadcast mode by the controller to inquire capabilities of each of the physical switches;

wherein the first control message comprises 8 fields of: a message type (MsgType), a service ID (SrvID), a service description (SrvDesc), receiving node set (RecvSets), transmitting node sets (TransSets), a service support (SrvSupport), a service configuration result (ConfResult) and a service configuration cost (ConfCost); wherein a MsgType value of 0 represents query, a MsgType value of 1 represents reply, a MsgType value of 2 represents service installation and a MsgType value of 3 represents service;

wherein when querying capabilities of each of the physical switches, the MsgType in Msg-1 is set to 0, an initial value of the RecvSets is set to null; initial values of SrvSupport, ConfResult and ConfCost are all set to −1;

step (4) after receiving Msg-1, firstly checking whether the physical switches support services corresponding to SrvID by the physical switches; if the physical switches fail to support services corresponding to SrvID, a value of the SrvSupport is set to 1; if the physical switches are capable of supporting the services corresponding to SrvID, a field value of the SrvSupport is set to 0.

3. The method for configuring software-definable network service, as recited in claim 1, further comprising a step of: step (5): writing the value of the SrvSupport set in the step (4) into a second control message (Msg-2) by the physical switches; wherein the value of MsgType is set to 1, other field values are identical to Msg-1; the Msg-2 is sent back to the controller in a unicast mode.

4. The method for configuring software-definable network service, as recited in claim 2, further comprising a step of: step (6) after receiving the Msg-2 by the controller, selecting the physical switches being capable of supporting the service corresponding to the SrvID; and constituting a virtual net vNet based on the service corresponding to the SrvID.

5. The method for configuring software-definable network service, as recited in claim 3, further comprising a step of: step (7) executing a user-defined path planning algorithm in the virtual net vNet to obtain optimal service deployment path (Path), so as to constitute service install nodes set (SrvInstallSets); wherein each element in the SrvInstallSets corresponds to a physical switch in the Path.

6. The method for configuring software-definable network service, as recited in claim 4, further comprising a step of: step (8) sending a third control massage (Msg-3) to each of the physical switches on the Path in a multicast mode by the controller; and starting an installing process of a service corresponding to the SrvID; wherein a MsgType of the third control message (Msg-3) is set 2, a field of the RecvSets is set to SrvInstallSets; a field of the SrvSupport is set to 1, a field of the ConfResult is set to −1 and a field of the ConfCost is set to −1.

7. The method for configuring software-definable network service, as recited in claim 5, further comprising a step of: step (9) after receiving the third control message Msg-3, each of the physical switches executing following steps of: step (9-1) determining whether the physical switches belong to the field of RecvSets in the Msg-3, if no, a value of the field of the ConfResult is set to 2, enter step (9-3); if yes, directly enter a step (9-2); step (9-2) executing a service installing process by the physical switches, wherein if the installing process succeeds, the value of the field of the ConfCost is set to be an overhead of the current resource; while the value of the field of ConfResult is set to 0; if the installing process is failed, the value of the field of ConfResult is set to 1; step (9-3) writing values of fields which are revised into a fourth control message (Msg-4) by the physical switches, wherein MsgType is set to 1, other fields are identical to the third control message Msg-3; transmitting the fourth control message Msg-4 back to the controller in a unicast mode.

8. The method for configuring software-definable network service, as recited in claim 6, further comprising a step of: step (10) traversing the control message Msg-4 transmitted back by each of the physical switches in the nodes set SrvInstallSets by the controller; wherein if the value of the field of the ConfResult of the fourth control message Msg-4 is 0, service configuration is successful; updating messages in the virtual net vNet according to the field of ConfCost; wherein if not all values of fields of the ConfResult of all of the control messages are 0, the service configuration is not successful; executing following steps; step (10-1) constituting a fifth control message Msg-5 by the controller; setting the MsgType to 3; wherein other fields of the Msg-5 are identical to the fields of the Msg-3; wherein the fifth control messages Msg-5 are transmitted to each of the physical switches on the Path in a multicast mode; step (10-2) uninstalling service corresponding to SrvID after receiving the Msg-5 by the physical switches; finding out a physical switch corresponded to the fourth control message Msg-4 with a ConfResult field value of 1 by the controller and identifying the physical switch as unavailable in the vNet; entering the step (7).

* * * * *